Patented June 27, 1950

2,513,121

UNITED STATES PATENT OFFICE 2,513,121

COATING COMPOSITIONS AND METHOD OF MAKING THE SAME

Richard Tutt, Jr., and John R. Hubbard, Gowanda, N. Y., assignors to Peter Cooper Corporations, Gowanda, N. Y.

No Drawing. Application September 25, 1946, Serial No. 699,352

6 Claims. (Cl. 106—137)

This invention relates to coating compositions and more particularly to coating compositions containing animal glue as the adhesive or bonding agent.

One object of this invention is to provide an improved coating composition of this type containing a high percentage of solids and having improved flow characteristics for commercial coating operations, and which is particularly adapted to the machine coating of paper or other surfaces. Another object of this invention is to provide a method of successfully using animal glue as an adhesive in alkaline coating compositions by eliminating the customary alkaline hydrolysis and structural break-down of the normal animal glues in alkaline media. A further object is to provide coating compositions which use animal glue as an adhesive, and which are particularly resistant to bacterial and chemical breakdown upon long storage of the prepared coating composition. Another object is to provide a method of preparing coating compositions of various solids concentrations and using animal glue as the adhesive, which compositions possess improved flow characteristics over similar compositions made by other methods. An additional object is to provide a coating composition and a method of preparing the same, using animal glue as the adhesive, wherein the adhesive demand of such coating compositions is substantially reduced over the prior art.

Other objects and advantages of this invention will be apparent from the following description and claims.

Coating compositions as herein referred to are commonly applied to paper webs for the production of coated papers for use in wrapping, printing and lithography, but it is not intended to limit the use of this composition to paper, since the composition may be applied to other webs or surfaces on which a smooth protective coating is desired. These coatings generally comprise stable aqueous mixtures of pigments, such as clay with or without other well known pigments commonly employed in coating compositions, such for example as calcium carbonate, titanium dioxide, satin white, blanc fixe and others, together with an adhesive or bonding agent.

In the manufacture of coated papers, there is a demand for coating compositions, sometimes called "color mixes" which have a high solids content, of from 50% to 70% of solids. These high-solids compositions are particularly desirable for use in the newer "machine coating" operations, in which the coatings are applied to the paper on the paper making machine. In this operation, a low ratio of water to pigment is required to enable rapid drying. Our improved composition may, however, be applied to paper webs by any other suitable means.

In the prior art, animal glues have been commonly used to bond the pigments to the base material. Animal glues are readily soluble in water, and require no alkali cutting as is common to casein and soya bean adhesives. Animal glues particularly in concentrations as prepared for coating purposes are readily hydrolyzed and destroyed by free alkalies or alkali treatment, and are, accordingly, not classed as alkali-proof adhesives. Animal glues are normally neutral or slightly acidic when dissolved in water; the usual pH range of such solutions being 7.4–5.8. Where animal glues are dissolved in hard waters containing bicarbonate and/or carbonate hardness, or where a neutral or slightly acid glue solution is treated with minor amounts of alkaline salts or alkalies for correction of pH, the pH may range as high as 8.0 in rare cases, with no adverse hydrolysis of the animal glue protein. Where the animal glue solution contains sufficient carbonate alkalinity or its alkali equivalent to give an alkaline reaction in the presence of phenolphthalein (pH 8.1–8.2 or above), free alkali is considered to be present, and such a condition readily hydrolyzes and destroys the animal glue protein structure. The terms "normal animal glue solution" and "alkali free animal glue solution" are herein used to designate a solution of animal glue in water, the final solution containing no free alkali or hydroxyl ions as measured by alkalinity to phenolphthalein Such animal glue bonded coatings using clay as the major part of the pigment are characterized by a neutral or slightly acidic reaction due to the neutral or slight acidic properties of the glue and the slightly acidic reaction of normal clays. Where the mixture of clay and glue is relatively acidic in nature, the resulting mixture shows a tendency to coagulate and thicken during preparation. Where the glue was decidedly acidic in nature, it has been customary in some cases to neutralize the excess acidity by the addition of small amounts of alkali directly to the glue solution, care being taken to avoid adding excess alkali to preclude the possibility of alkaline hydrolysis or structural break-down of the animal glue. Such procedures resulted in approximately neutral compositions in the pH range of from 6.0 to 7.4. With these compositions, if the solids content is approximately 40%, the resultant coagulation is not so severe but that the composition can be milled out to a smooth paint-like flowing liquid by agitation or by the shearing action of the impeller of a mixing apparatus. Such low solids compositions are suitable for brush application, but are not generally desirable for "machine coating."

By increasing the solids content of these prior art compositions above 40%, the coagulating reaction between the clay and the glue, as with other proteins commonly used, becomes progressively more severe and at 60% to 65% total solids, the mass becomes a stiff putty-like paste which cannot be satisfactorily milled out by shearing or agitation into a flowable liquid.

We have found that by controlling the alkaline balance of a clay coating composition both as to the amount of alkali and the time and order of introduction to the composition, a marked colloidal change can be effected in the properties of the clay and its interaction with animal glue, thus providing a more complete deflocculation of the clay, a better adsorption of the glue thereon, and a finer dispersion of the composition, resulting in a lowered adhesive requirement and smoother flowing properties. Further advantages of our invention are an improved stability of the composition against bacterial break-down, the elimination of the customary alkaline hydrolysis of the animal glue, and the ability to produce the desired high solids concentrations above 45% and particularly in the range of 60% to 70%. In coating compositions prior to our invention, such high solids concentrations were impossible to attain in satisfactory coating compositions using animal glue. It was also heretofore impossible to produce a satisfactory smooth flowing alkaline composition whose hydrogen ion concentration is in the range of 9.0 to 11.5 with animal glue as an adhesive, due to the well known alkaline hydrolysis and structural break-down of this natural protein in such alkaline media, following the procedures commonly employed in the coating industry.

In the preferred embodiment of this invention, the coating compositions are prepared according to the following procedure. A deflocculator of any well known type may be added to the water in which the clay is to be dispersed and the clay then dispersed in the water by any suitable means of agitation, or the clay and water may be milled to a heavy paste and the deflocculator added slowly thereafter, effecting the dispersion of the pigment by continued agitation. An alkali or alkaline salt in solution form is then slowly added to the deflocculated wet-out clay slip and then stirred or agitated to smooth the mixture. Sufficient alkali material is added so that the final composition will have a pH in the range of about 8.5 to 11.5. Any auxiliary pigment to be used in the composition is then added to the alkalized liquid clay slip in dry or dispersed state, followed by further stirring or agitation to provide a smooth uniform mixture. A normal animal glue solution is then added by stirring or agitation to completely disperse the glue solution in the liquid and to produce a composition of uniform consistency. This composition is then ready to be applied to a web or other surface in any suitable or usual manner, such as brushing, rollers, doctor blades, jets, or the like.

By following out the steps of the process substantially in the order stated, and by adding the normal glue solution after the clay and pigments have been deflocculated and alkalized, coating compositions can be produced having high solids concentrations with desirable fluidities, and having an alkaline pH which, however, does not hydrolyze or deteriorate the glue. Such compositions deposit unusually fine coatings on paper or other materials or surfaces, improve ink receptivity, and enhance the drying of lithographic inks.

While the exact chemical, physical and colloidal reactions are not known with certainty, the following explanation is believed to be correct. The deflocculator appears to peptize the clay or clay containing pigment. Upon addition of a caustic or other alkaline material, the clay thickens moderately and then gradually becomes more fluid upon continued milling, shearing, or agitation. This indicates a colloidal-chemical reaction of the alkali on the acidic properties of the clay, involving colloidal charge rearrangements. It is quite evident that the deflocculator-alkali exerts a modifying influence on the clay pigment. Tests have been made with compositions in which either the deflocculator or alkali have been omitted, and these tests show that it is impossible to obtain high solids concentration compositions possessing the desired fluidities and other desirable qualities, when either of these ingredients is omitted, and when a high-solids content is desired. The combination of the deflocculator and the alkaline material promotes finer deflocculation and dispersion of the clay or clay mixtures with other pigments, which is very desirable.

Upon the addition of the normal glue solution to the pigment slip prepared according to the method of this invention, the customary coagulation which generally occurs when neutral glue is added to neutral or weakly acidic clay slips is eliminated, and the resultant fluidity of the composition at moderate to high solids concentrations is markedly increased over that of prior art coating compositions using animal glue. The normal animal glue colloid on first being added to the alkaline slip is practically neutral, and is but weakly negatively charged. On mixing with the strongly negatively charged clay slip, the glue is adsorbed upon the surface of the clay particles due to the difference in degree of the negative charges possessed by the pigment and animal glue. As the glue takes up additional negative charges, the newly formed pigment-glue particles will become strongly negatively charged, thereby promoting a finely divided stable dispersion. Upon drying such coating compositions, the adjacent glue films of the particles bond together providing a uniform continuous film, with the pigment particles well covered and protected by the adhesive. It is our belief that this condition explains why less adhesive can be used for coating compositions prepared by our improved method.

We have by our improved process overcome the usual alkaline break-down or hydrolysis of animal glue which takes place when this adhesive is used in alkaline coating compositions by processes heretofore common in the prior art. By the use of our process, the clay with or without other mineral pigments apparently reacts with or adsorbs the major part of the free alkali, thus providing in some measure a buffered chemical condition in which an insufficient concentration of free alkali is available for the hydrolysis or break-down of the protein and yet provides sufficient OH ions to promote the colloidal changes necessary to the successful stable dispersion of the pigment-glue composition. According to prior art procedures in which the alkali is added directly to the adhesive before the adhesive is incorporated in the clay or clay-pigment slip, it is common knowledge that animal glue is quickly destroyed by an alkaline hydrolysis, thus resulting in coating compositions which will flake off readily from the base stock or surface on which it is deposited. If in a coating process, glue solutions were prepared for use in our composition employing 12% glue and 0.5% of caustic soda, both based on the weight of the pigment, this 0.5% of caustic on the clay is equal to 4.17% based on the glue. Such percentage of caustic soda if added directly to a glue solution as commonly prepared for coating would either destroy the glue or seriously impair its adhesive properties.

For use in connection with our process, the glue solutions may be prepared in various concentrations ranging from equal parts of water and glue by weight to three parts of water to one part of glue, depending upon the final water ratio to solids in the final composition, the glue being first soaked in cold water and then melted at 140° F.

We have found that by controlling the pH of the final coating composition in the approximate range of 9.3 to 11.5, that the stability of the composition against bacterial infection or breakdown is markedly improved over the prior art when using animal glues. Many test compositions made in accordance with our process have been incubated for periods of thirty days at temperatures ranging from 80° F. to 100° F. with no loss in adhesive properties. At pH values below 9.3, the preservative effect of our composition is decreased, except when borax is used as the alkaline agent, which is no doubt due to the well known preservative qualities of borax, and the fact that relatively large quantities of borax are required when used in our process.

The term "deflocculator" is herein used to designate any of the deflocculators commonly used in the coating industry. Excellent results have been obtained by using a deflocculator sold under the trade name of Calgon, which is a glassy hexametaphosphate. Equally good results can frequently be obtained by using tetra sodium pyrophosphate, sodium hexametaphosphate, or sodium tetra phosphate. The quantity of deflocculator used may vary from 0.25% to 1.5%, based on the weight of the clay used and the quantity may also depend upon the total solids concentration and the characteristics of the clay. 0.5% is an average quantity of deflocculator for total solids concentrations of from 40% to 57% and 1.0% for concentrations from 60% to 65%.

Any alkalies or alkaline salts which have no adverse effect upon the composition may be employed. Preferably caustic soda is used to the extent of 0.5% based on the dry weight of the clay, since caustic soda is not only very satisfactory for this purpose, but also inexpensive. The quantity of alkali may be increased or decreased so that the final completed coating composition will be in the pH range of from 8.5 to 11.5 and preferably from 9.3 to 11.5 at a temperature of 100° F. The usual quantity of caustic soda will, consequently, be from 0.3% to 1.0% based on the dry weight of the clay.

When alkalies or alkaline materials other than the sodium hydroxide are used, the following table gives the approximate requirements of such chemicals. Such quantities may be varied due to variations in type of clay, solids concentrations and the like.

Where 0.5% sodium hydroxide on weight of clay is standard, use 4.5% ammonium hydroxide (0.9 S. G.) or 2-3% soda ash, or 0.5-0.75% potassium hydroxide, or 4% N brand silicate of soda, or 2% N brand silicate of soda plus 0.2% NaOH, or 3-4% trisodium phosphate or 3-4% borax.

While the foregoing gives approximate quantities of various alkaline materials, it should be borne in mind that the quantities used should be such as to produce the desired pH of the final product. Some other alkaline salts not above listed would necessitate the use of rather large quantities to provide the desired final pH and such alkalies should not be used if they adversely affect the quality of the composition. Mixtures of alkalies may, of course, be employed, if desired.

The pigments employed may include any of those coating clays or mixtures of clays normally used for coating paper and like materials. The process herein described has been found particularly suited in some instances to those clays which are generally found more difficult to handle due to their high viscosities and colloidal properties. To these clays may be added those grades of calcium carbonate, satin white, titanium dioxide, and blanc fixe, which have been processed for use in the coating industry, and these clays may be blended or mixed as desired.

The animal glues used may also be of any type, including green bone, extracted bone and hide glues and mixtures of the same. All of the grades of these glues are suitable for use with this process, but preference is given to moderately low testing hide or extracted bone blends which are commonly used in the coating industry. From 6% to 30% dry weight of glue, based on the dry weight of pigment is satisfactory, depending upon the particular adhesive demand of the individual composition and upon the total solids content and the base stock to which it is to be bound. For most uses, a range of from 8% to 15% of glue is sufficient.

The following table shows the results of tests made in the production of coating compositions with and without the use of an alkali. In this table, tests A1 to A4 inclusive were made without the use of an alkali and tests B1 to B5 inclusive were made in accordance with our process. The percentages indicated are by weight, based upon the weight of the pigment used, these tests having been made with clay only as a pigment.

In the following table, the Pick test referred to is the Dennison Wax Pick test for adhesive qualities, which is standard in the coating industry, and the higher the numbers, the better the adhesive bond of the coating. The coatings were applied at 83° F. "Coat after 7 days" refers to a new coating made after aging the original coating composition for a period of seven days.

| No. | Clay | Calgon | Caustic Soda | Animal Glue | Total Water | Per cent Solids | pH 100° F. | Pick Test | Coat after 7 days Pick Test |
|---|---|---|---|---|---|---|---|---|---|
| A1 | 100 | 0.5 | 0 | 12 | 261 | 30 | 6.2 | 6 | (²) |
| A2 | 100 | 0.5 | 0 | 12 | 168 | 40 | 6.1 | 6 | (²) |
| A3 | 100 | 0.5 | 0 | 12 | 112 | 50 | 5.9 | 6 | (²) |
| A4 | 100 | 0.5 | 0 | 12 | 75 | 60 | 5.75 | (¹) | (²) |
| B1 | 100 | 0.5 | 0.5 | 12 | 261 | 30 | 9.8 | 8 | 6 |
| B2 | 100 | 0.5 | 0.5 | 12 | 168 | 40 | 10.0 | 8 | 7 |
| B3 | 100 | 0.5 | 0.5 | 12 | 112 | 50 | 9.9 | 8 | 8 |
| B4 | 100 | 0.5 | 0.5 | 12 | 75 | 60 | 10.2 | 8 | 8 |
| B5 | 100 | 1.0 | 0.5 | 8 | 58.7 | 65 | 11.0 | 8 | not run |

¹ 60% solids without caustic soda would not flow or spread.
² Developed decomposition in three days, spoiled, destroyed.

Series A was prepared in the usual manner; the Calgon dissolved in 144 parts of water; 100 parts "satin" clay added and dispersed to a thin flowing slip; 12 parts of dry animal glue were dissolved in 24 parts of water at 140° F. and added with stirring; the resultant coating (A1) strained through a 180 mesh sieve; then applied to coating stock by Bird applicator. With increase in total solids the clay-water ratio was progressively diminished, lowering the glue-water ratio as required to offer maximum processing fluidities, as is customary in the coating field.

In experiments B1 to B5 inclusive, the preparation of the composition for test B4 is illustrative of all of the compositions used in these tests. In this test 0.5 part of Calgon was dissolved in 45.7 parts of water and to this were added 100 parts of "satin" clay and the clay was thoroughly deflocculated and dispersed in the water to a smooth flowing slip by means of agitation. 0.5% of sodium hydroxide was dissolved in 5 parts of water and slowly added to the deflocculated clay slip and dispersed therein by rapid stirring of the mixture to a smooth creamy paste.

12 parts of the hide glue (Peter Cooper Standard #1½) were dissolved in 24 parts of water at a temperature of 140° F. This warm glue solution was then added slowly to the causticized clay slip and thoroughly dispersed therein by rapid stirring until a smooth creamy readily flowable liquid coating mixture was obtained which could be strained through a 180 mesh screen. The pH of the composition measured on a Beckman glass electrode was 10.2. The coating was made on a paper stock with a Bird hand applicator and was dried and subjected to the Dennison Wax Pick Tests for adhesive qualities. A #8 wax pick test was secured. The remainder of the coating mixture was then incubated at 100° F. for seven days. No moulds or odors of decomposition developed, thus indicating that there was no bacterial break-down. Another coating was then made in the same manner with this seven day old composition on the same base paper stock and, after drying was again checked with the Dennison waxes for pick test. A #8 wax pick test was again secured, indicating that there was no alkaline hydrolysis of the glue nor structural break-down.

In the case of composition B5, the viscosity of this 65% solids composition was taken on the Brookfield Viscosimeter with #3 spindle, securing the following readings at 100° F.

```
                                            Centipoises
6 R. P. M. _____    7,920
12 R. P. M. _____    4,500
30 R. P. M. _____    2,256
60 R. P. M. _____    1,448
```

The composition was then stored at prevailing room temperatures for thirty days and no visible settling of solids took place and no moulds or odors of decomposition appeared in that period of time.

When calcium carbonate pigment is to be a component part of the coating, as for example, in a mixed pigment of 50 parts of clay and 50 parts of calcium carbonate, the following procedure produced the best results, all parts being by weight. 0.5 part of Calgon is dissolved in 40 parts of water, followed by the addition of 50 parts of SMC clay and subsequent dispersion of same by agitation. 0.25 part of sodium hydroxide or a corresponding quantity of another alkali is dissolved in two and one-half parts of water and slowly added to the deflocculated and dispersed clay and the mixture stirred into a creamy liquid clay slurry. To this slurry while under agitation is slowly added, by sifting in, 50 parts of dry calcium carbonate, milling the mass constantly until a smooth creamy semi-plastic flow is secured. A warm glue solution comprising 8 parts of glue dissolved in 16 parts of water is then slowly added to the creamy, heavy, causticized mixture of clay and calcium carbonate and thoroughly dispersed therein with rapid stirring until a smooth paint-like easy-flowing mixture is secured. This coating mixture of 65% total solids when applied to paper stock and subjected to Dennison wax pick tests for adhesive qualities showed that wax #6 cleared without rupture. This coating composition had the same desirable keeping qualities as other coating compositions made in accordance with this invention. We have found that by first dispersing and alkali treating the clay before addition of either the dry or the wetted-out calcium carbonate, that better fluidity and increased efficiency resulted than when the clay and calcium carbonate pigments were first mixed while dry and then added to the water containing the deflocculator, with subsequent alkali treatment.

When titanium dioxide pigment is to be a component part of the coating, as for example in a mixed pigment of 75 parts of clay and 25 parts of titanium dioxide, the following procedure gave the best results, all parts being by weight. 0.75 part of Calgon was dissolved in 28.8 parts of water and to this were added the 75 parts of SMC clay which were thoroughly deflocculated and dispersed in the water. 0.5 part of sodium hydroxide dissolved in 5 parts of water was slowly added to the deflocculated and dispersed clay, and the mass stirred until a smooth creamy paste-like clay slip was obtained. 0.25 part of tetra sodium pyrophosphate was dissolved in 16.8 parts of water, and to this were added the 25 parts of titanium dioxide and thoroughly dispersed to form a smooth slip. This slip was then added slowly to the causticized clay slip and thoroughly dispersed therein until a smooth creamy-like semi-plastic flow was secured. 12 parts of dry glue were dissolved in 24 parts of water and the temperature brought up to 140°, and this warm solution was slowly added with rapid stirring to the semi-plastic clay-titanium mixture and thoroughly dispersed therein. This produced a pH of 10.35 and when this composition of 60% total solids was coated on paper, a #8 Dennison wax pick test was secured. Other deflocculators and alkalies may, of course, be used in this example. While titanium pigment may be dry mixed with the clay and subsequently deflocculated by the addition of water containing a deflocculator, followed by the addition of alkali and then by the addition of the glue solution, the results thus obtained are not as desirable as those obtained when the clay and titanium dioxide were separately deflocculated in water, and the deflocculated titanium dioxide added to the deflocculated and alkalized clay slip. Our preferred method produces better dispersion of the pigments, a whiter coating and slightly better fluidity, since the titanium pigment is apparently adsorbed on the surface of the clay.

When satin white pigment is used in connection with the clay pigment, the satin white, which is in paste form, is milled in by rapid stirring to the causticized clay slip produced as heretofore described. We have found that when satin white pigment is added to a deflocculated clay slip before causticizing the same with alkali and the resultant mixed pigment slip then causticized, followed by the addition of the glue solution, the resultant coating possesses an extremely low pick test. If, however, the deflocculated clay slip is alkali treated before addition of the satin white, pick tests up to Wax #8 were obtained, when the coating composition was comprised of the following, all parts being by weight: 75 parts SMC clay, 38.5 parts satin white (65% dry solids), 12 parts glue, 0.75 part Calgon, 0.375 part caustic soda, and 99.75 parts water to provide a 50% solids concentration.

Where the barium sulfate type pigments are used in connection with clays, best results are obtained when such type pigments are added to the deflocculated, alkaline treated clay slip. Blanc fixe, in its usual paste form, is easily added and dispersed by agitation. When using barytes, the following procedure proved advantageous in a mixed pigment of 75 parts clay and 37.5 parts barytes, all parts being by weight; 0.75 part of Calgon was dissolved in 41 parts of water, and 75 parts of SMC clay therein dispersed by simple agitation. 0.5 part of caustic soda was dissolved in 5 parts of water and the clay slip causticized as heretofore described. 0.13 part of Calgon was dissolved in 7.5 parts of water, and the barytes therein dispersed by agitation to form a separate barytes slip. This was then slowly added to the alkalized clay slip, and thoroughly dispersed by agitation. 10 parts of dry glue were dissolved in 10 parts of water and the warm glue solution added to the pigments and thoroughly dispersed therein. The pH of the final composition containing 65% solids was 10.8. A wax pick test of 7 was secured.

By separately dispersing and deflocculating the clay and the barytes and causticizing the clay slip before adding the barytes slip, greater fluidity and better coating properties were obtained than by dispersing the mixed pigments followed by the alkaline treatment.

In the examples of mixed pigment coatings where clays are present in at least equal or larger amounts than the other pigment or pigments, best results are obtained where the other pigment is added to the deflocculated alkaline-treated clay, followed by the addition of the glue solution. Our improved method of preparing mixed pigments for use in connection with coating compositions may be employed with adhesives other than animal glue, but optimum effects are obtained when animal glue is the adhesive. We believe the following theory explains such action: By treating the thoroughly deflocculated clay with an alkali, the normal acidic properties of the clay are changed, and the alkaline clay particles now bear rather strong negative charges. Upon addition of other pigments, such pigments are adsorbed upon the surface of the clay particles by reason of the difference in charge of the alkaline clay and the added pigments, so that the newly formed clay-pigment particles now bear negative charges of their own. When the normal glue solution is introduced, the glue is adsorbed on the strongly negatively charged clay-pigment particles by difference in charge potentials. The small clay-pigment-glue particles gradually assume like negative charges which in the pH range of 9.0 to 11.5 are appreciable. These strong like charges stabilize the coating composition by repulsion, and aid in the formation of the desired fluidities of such coatings. The clay absorbs and/or adsorbs the alkali in such a manner that insufficient free alkali is available in the composition to hydrolyze the glue protein, yet liberates sufficient OH ions to give the desired charge relationships.

Substantially identical results with those given by the foregoing examples were obtained when clays from different sources but of equivalent properties were used, and when different alkalies were used in accordance with the percentages hereinbefore stated.

Various modifiers of the type which are commonly used in the making of coating compositions of this type may be added to our improved composition, such for example as waxes, softeners, plasticizers, animal glue gel-depressants and the like.

While we have described our process and composition as particularly suitable for use in preparing coating compositions having relatively high percentages of solids, it is not intended to limit this invention to such compositions alone, since the improvements herein described may be used very effectively with coating compositions having those lower percentages of solids common to the art. The solids concentrations will be in the approximate range of 30% to 70%.

We claim as our invention:

1. The process of making an alkaline type, stable, aqueous coating composition of at least 30% dry solids containing animal glue as the adhesive bonding agent, and in which the animal glue is protected against alkaline hydrolysis and bacterial break-down, comprising the steps of making a deflocculated dispersion of clay in water with the aid of a deflocculating agent, adding an alkaline material to said water dispersion, intimately mixing said alkaline material with said mixture and then adding to said mixture a normal animal glue solution, the quantity of alkali added being sufficient to provide a final composition having a pH ranging from 8.5 to 11.5.

2. The process of making an alkaline type, stable, aqueous coating composition containing animal glue as the adhesive bonding agent and consisting mainly, and in which the animal glue is protected against alkaline hydrolysis and bacterial break-down, comprising the steps of forming a deflocculated dispersion of coating clay in water with the aid of a deflocculating agent, adding an alkaline material to the mixture in quantity sufficient so that the final composition will have a pH of from 8.5 to 11.5, making an alkali-free animal glue solution containing sufficient glue to bond together the clay particles when the composition is applied to a surface, then adding said glue solution to said dispersion of clay in water, and alkaline material while thoroughly mixing the composition.

3. The process of making an alkaline type, stable, aqueous coating composition containing animal glue as the adhesive bonding agent, and in which the animal glue is protected against alkaline hydrolysis and bacterial break-down, comprising the steps of forming a deflocculated coating slip comprising a major part by weight of clay and a minor part by weight of a deflocculating agent, adding an alkaline material to the mixture in quantity sufficient so that the final composition will have a pH of from 8.5 to 11.5, making an alkali-free animal glue solution containing sufficient glue to bond together the pigment particles when the composition is applied to a surface, then adding said glue solution to said alkalized coating slip while thoroughly mixing the composition.

4. A process according to claim 1, in which the alkaline material is caustic soda and in which the quantity of caustic soda used in said composition is from 0.25% to 1.0% based on the weight of the clay in the composition.

5. The process of making an alkaline type, stable, aqueous coating composition containing animal glue as the adhesive bonding agent, and in which the animal glue is protected against alkaline hydrolysis and bacterial break-down, comprising the steps of forming a deflocculated coating slip containing mainly a coating clay and a deflocculator, agitating the resulting mixture to disperse the deflocculated clay uniformly in the same, adding an alkaline material to the clay slip in quantity sufficient so that the final composition will have a pH of from 8.5 to 11.5, making an alkali-free animal glue solution containing from 6% to 30% dry glue based on the weight of the clay used, then adding said glue solution to said mixture of clay, water, deflocculator and alkali material while thoroughly mixing the composition.

6. The process of making an alkaline type, stable, aqueous coating composition containing animal glue as the adhesive bonding agent, and in which the animal glue is protected against alkaline hydrolysis and bacterial break-down, comprising the steps of forming a deflocculated clay slip in water, steps of forming a deflocculated clay slip in water by the addition of clay to an aqueous solution of a deflocculator, agitating the resulting slip to disperse the deflocculated clay uniformly in the same, adding an alkaline material to the slip in quantity sufficient so that the final composition will have a pH of from 8.5 to 11.5, adding a pigment and agitating the liquid to produce a uniform dispersion of said pigment in said clay slip, making an alkali-free animal glue solution containing sufficient glue to bond together the clay and added pigment particles and to bond said coating composition to a surface to which it is applied, and then adding said glue solution to said coating slip while thoroughly agitating the same.

RICHARD TUTT, Jr.
JOHN R. HUBBARD.

REFERENCES CITED

The following references are of record in the file of this patent:

UNITED STATES PATENTS

| Number | Name | Date |
|---|---|---|
| 1,888,560 | Mauer | Nov. 22, 1932 |
| 2,212,629 | Alessandrioni | Aug. 27, 1940 |
| 2,231,902 | Offutt | Feb. 18, 1941 |
| 2,296,066 | Sloan | Sept. 15, 1942 |
| 2,425,231 | Dickerman et al. | Aug. 5, 1947 |